INVENTOR
B. R. SALTZBERG
BY J. P. Kearns
ATTORNEY

United States Patent Office 3,511,936

Patented May 12, 1970

3,511,936

MULTIPLY ORTHOGONAL SYSTEM FOR TRANSMITTING DATA SIGNALS THROUGH FREQUENCY OVERLAPPING CHANNELS

Burton R. Saltzberg, Middletown, N.J., assignor to Bell Telephone Laboratories, Incorporated, Murray Hill and Berkeley Heights, N.J., a corporation of New York Filed May 26, 1967, Ser. No. 641,661

Int. Cl. H04j *1/00*

U.S. Cl. 179—15 7 Claims

ABSTRACT OF THE DISCLOSURE

A data transmission system in which a plurality of pairs of time staggered data signals modulate in-phase and quadrature components of a plurality of carrier waves so that the resultant modulated signals overlap in the frequency domain. The timing of the data signals and the phasing of the carrier waves are derived from a basic oscillator in combination with a plurality of phase-locked oscillators synchronized to various harmonics of the basic oscillator. These overlapping signals are added together and transmitted with an amplitude-modulated pilot tone. At the receiver, each component of each carrier wave is demodulated, low-pass filtered and sampled to recover the original data signals.

BACKGROUND OF THE INVENTION

Field of the invention

This invention relates to a data communications system and particularly to a data communication system in which a plurality of data signals may be frequency multiplexed for parallel transmission through a bandwidth-limited transmission medium.

Description of the prior art

Data signals generated in parallel, such as ones from telemetering equipment, are often combined in a parallel-to-serial conversion multiplexer for transmission to a remote location. At the remote location, a receiver employs a serial-to-parallel conversion multiplexer to recover the parallel data signals. Use of time multiplexing techniques increase the cost of transmitting and receiving terminal equipment but results in a more efficient usage of available bandwidth. The reason present parallel transmission techniques result in inefficient utilization of bandwidth is that guard bands or channels are placed between adjacent signaling bands or channels to prevent interchannel interferences. Even if sharp cutoff filters could be designed so that parallel-signaling channels could be placed side by side without interchannel interference, the bandwidth consumed by each signaling channel would still exceed the Nyquist bandwidth of the signal transmitted.

Parallel transmission, however, does have one major advantage over serial transmission. A group of narrowband signals transmitted in parallel through a wideband dispersive transmission channel suffers less from the effects of delay distortion than does a wideband serial signal having the same information content. In order to attain full bandwidth utilization in a serial transmission system, amplitude and delay equalization devices are often included in the receiver. Therefore, to aid in choosing between the use of a wideband serial transmission system and a narrowband parallel transmission system for data, one should compare the relative cost of terminal equipment with the cost of the bandwidth required of the channel.

Systems have been developed to increase bandwidth utilization efficiency in parallel transmission systems so that the advantages inherent in parallel transmission may be obtained without wasting valuable bandwidth. In one such system, an in-phase carrier signal is modulated with a first information signal and a quadrature signal is modulated with a second information signal. To separate the two information signals at the receiver, each modulated signal is filtered so that the interfering frequency components from the other modulated signal are symmetrical in the frequency domain with respect to the carrier frequency. The filtered signal is product demodulated to provide the unaltered information signal. Other systems have been developed for transmitting information signals in a plurality of overlapping signaling channels by employing quadrature carrier techniques. These systems require intricate correlation and storage devices to retrieve and extract independent signal information in the channels and are therefore too costly to justify their use, notwithstanding the bandwidth savings.

A system disclosed by F. K. Becker in copending U.S. patent application Ser. No. 629,631, filed Apr. 10, 1967, shows a plurality of phase-related carriers which are modulated by a plurality of data signals. The spacing between the carriers is equal to one-half the data rate of the data signals. The data signals can be recovered at a receiver by vestigial-sideband (VSB) filtering of the received signal, demodulating the filtered signal and sampling. The VSB bandpass filters are a major factor in the cost of the abovementioned system. A system which substitutes low-pass filters for the VSB bandpass filters offers distinct economic advantages.

BRIEF DESCRIPTION OF THE INVENTION

The present invention contemplates a system in which a plurality of pairs of bandlimited data signals all having the same predetermined data rate are generated in time quadrature to amplitude modulate alternate in-phase and quadrature components of a plurality of carrier waves in frequency quadrature, the carrier waves being separated by a frequency equal to the predetermined data rate so that the resultant modulation products overlap in the frequency domain. The overlapping modulation products are added together to form a composite signal and transmitted.

At a receiver, each data signal is recovered by demodulating the composite signal with a locally generated carrier, low-pass filtering to obtain symmetrical shaping in the frequency domain of overlapping signals and sampling at the predetermined data rate.

DETAILED DESCRIPTION

Figure 3:
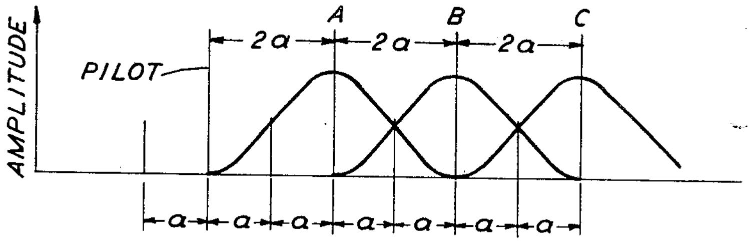
FIG. 3 shows in graphical form the signal spectra produced by the transmitter shown in FIG. 1.

For an understanding of the novel data transmission methods taught by this invention, one can see in FIG. 3 three phase-related carrier waves at frequencies designated A, B, and C each spaced from adjacent carriers by a frequency of $2a$. Each of the carrier waves A, B, and C has an in-phase component and a quadrature componen. Alternate in-phase and quadrature components of the carrier waves have been amplitude modulated by one of a group of first bandlimited data signals each providing a modulated carrier signal. The remaining components of the carrier waves A, B, and C have been amplitude modulated in a like manner by one of a group of second bandlimited data signals. Each of the bandlimited data signals has similar spectral shaping and a data rate equal to the carrier spacing (i.e., $2a$) so that each of the modulated carrier waves interfere with a quadrature interference signal at the same frequency and four overlapping signals from the two adjacent channels.

Each of the second data signals has a fixed time relationship to each of the first data signals. If the modulated carrier signals are to be transmitted through a non-dispersive transmission medium without interchannel interference, each of the second data signals must be in time quadrature with each of the first data signals and each of the in-phase components of the carrier waves must be in phase quadrature with each of the quadrature components of the carrier waves.

To recover, for example, the data signal modulating the in-phase components of the carrier wave B from the composite of overlapping and interfering signals shown in FIG. 3, one may multiply the composite signal with a carrier wave having a similar frequency and phase as the in-phase component of the carrier wave B to provide a product signal. The quadrature interference signal will provide only double frequency components which may be removed from the product signal by simple low-pass filtering. The overlapping signals may be made symmetrical with respect to the "dotting frequency" (i.e., $a$) with an appropriately shaped low-pass filter so that all four overlapping signals pass through zero at the sampling instants.

It is apparent that each of the data signals can be recovered from the composite signal by multiplying therefor the composite signal with the carrier wave component of interest, low-pass filtering with an appropriately shaped low-pass filter and sampling at the sampling instants for the data signal of interest. The composite signal could also be bandpass filtered before the producting. This, however, would require different bandpass filters for each carrier which are more difficult to match than are low-pass filters all of the same frequency. Further, if the symmetry of overlapping signals was achieved by bandpass filtering, a low-pass filter would still be needed in each channel to remove the double frequency components caused by producting of the quadrature interference signals.

Figure 1:
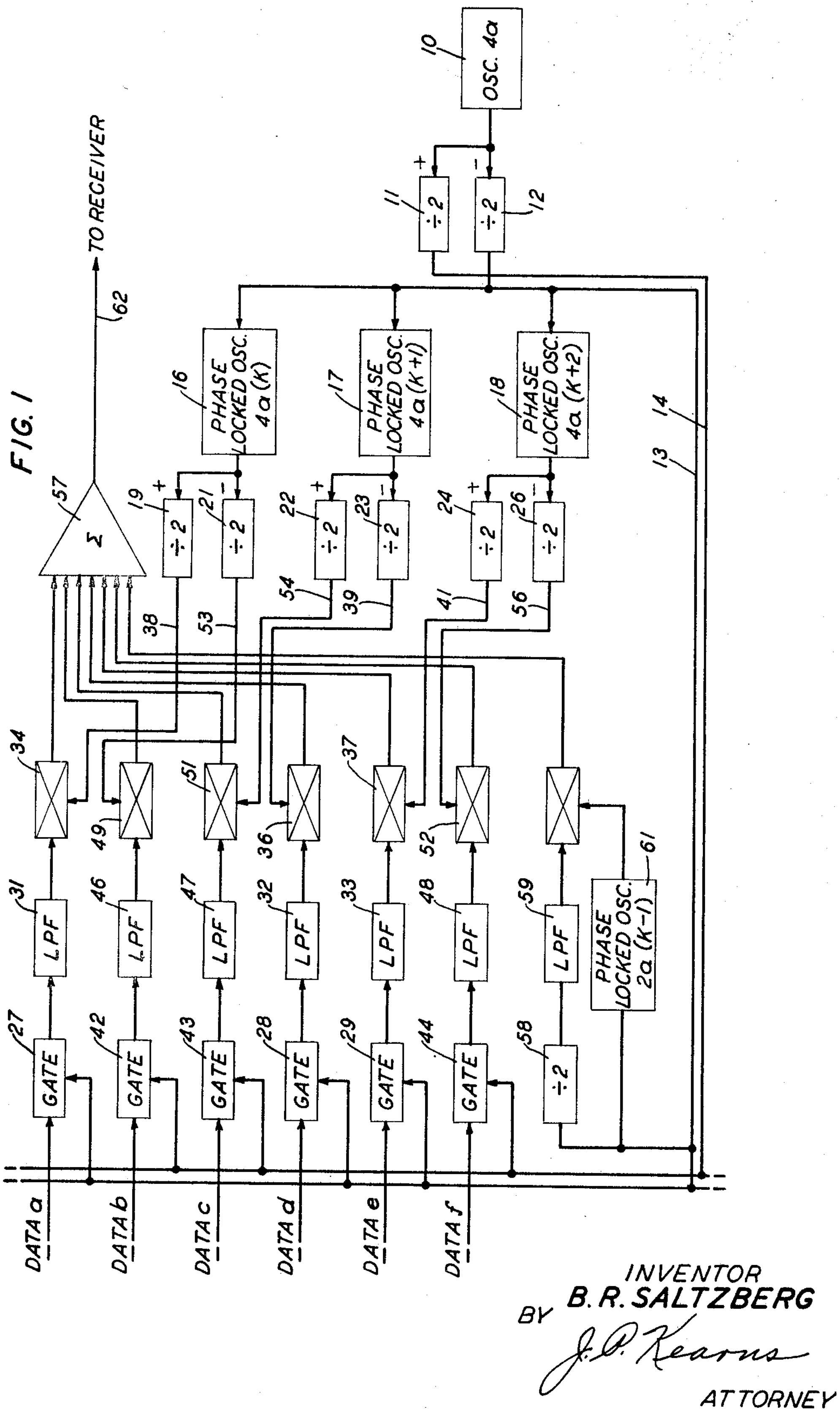
FIG. 1 represents in block diagram form a data transmitting station embodying the principles of this invention.

Referring now to FIG. 1, there is seen a multi-channel data transmitter embodying the principles of this invention. The timing of the data in the various channels and the frequency and phase of various carrier waves are controlled from a basic oscillator 10 having an output frequency of $4a$. This output is divided by a pair of frequency dividers 11 and 12 which provide respective quadrature and in-pass timing signals at a frequency of $2a$ on the leads 13 and 14, respectively. The frequency divider 11, which may be a flip-flop, is adapted to advance on positive transitions from oscillator 10. The frequency divider 12 is adapted to advance on negative transitions from oscillator 10. The in-phase timing signal on lead 13 is employed to control three phase-locked oscillators 16, 17, and 18. Each phase-locked oscillator 16, 17, and 18 is set to oscillate at a harmonic of a frequency $4a$, (i.e., $k$, $k+1$, $k+2$, respectively). The output of each phase-locked oscillator 16, 17, and 18 is divided by frequency dividers 19, 21, 22, 23, 24, and 26, respectively, to provide three pairs of carrier waves, each pair separated by the frequency $2a$ and each carrier wave having an in-phase and a quadrature component. It should be noted that the carrier wave components at the outputs of the frequency dividers 19, 22, and 24, are all in phase with each other and in quadrature with the carrier waves at the outputs of the frequency dividers 21, 23 and 26.

The in-phase timing signal on the lead 13 is employed to enable gates 27, 28, and 29 to pass data from a plurality of data sources, not shown, through spectral shaping low-pass filters 31, 32, and 33, respectively, to modulators 34, 36, and 37, respectively. The in-phase carrier of the phase-locked oscillator 16 is applied from frequency divider 19 by a lead 38 to the modulator 34. The quadrature component of the carrier generated by the phase-locked oscillator 17 is applied from the frequency divider 23 by lead 39 to the modulator 36. The in-phase component of the carrier generated by the phase-locked oscillator 18 is applied from the frequency divider 24 by the lead 41 to the modulator 37. Therefore, it is seen that a plurality of in-phase data signals having a data rate $2a$ alternately modulate in-phase and quadrature components of a plurality of carrier waves spaced from each other by a frequency $2a$.

In a like manner, the quadrature timing signal on the lead 14 enables gates 42, 43, and 44 to apply a plurality of data signals from sources, not shown, through low-pass filters 46, 47, and 48 to modulators 49, 51, and 52, respectively. The quadrature, in-phase and quadrature components from the phase-locked oscillators 16, 17, and 18, respectively, are applied from the frequency dividers 21, 22, and 26, respectively, by leads 53, 54, and 56, respectively, to the modulators 49, 51, and 52, respectively. Outputs from the six modulators 34, 49, 51, 36, 37, and 52 are added together for transmission in a summer 57 with an amplitude modulated pilot tone generated by dividing in-phase timing signals on lead 13 in a frequency divider 58 which shapes the divided signal with a low-pass filter 59 and employs the shaped signal to modulate a carrier generated by a phase-locked oscillator 61 locked to a frequency of $2a(k-1)$ to provide the signal shown in FIG. 3 to transmission medium 62.

Figure 2:
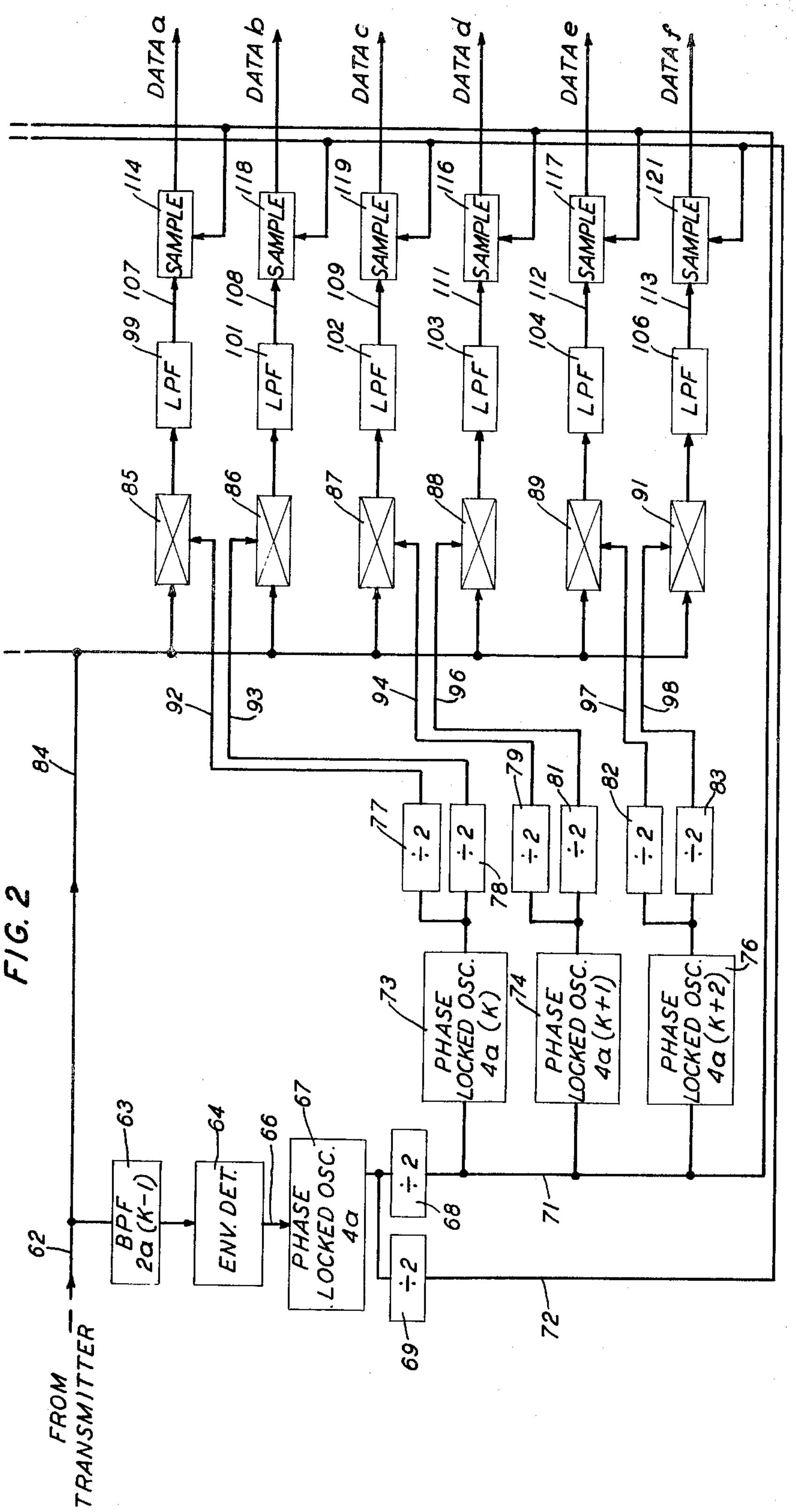
FIG. 2 represents in block diagram form a data receiving station constructed according to the teaching of this invention.

Referring now ot FIG. 2 which shows the receiver, the composite signal is applied from the transmission medium 62 to a bandpass filter 63 in series with an envelope detector 64 to provide a signal on lead 66 to synchronize a phase-locked oscillator 67 to a frequency $4a$. A pair of divide-by-two circuits 68 and 69 are provided to generate the in-phase quadrature timing signals at the receiver on lines 71 and 72, respectively. As in the transmitter, the in-phase timing signal is used to synchronize three phase-locked oscillators designated 73, 74, and 76 in the receiver. Divide-by-two circuits 77, 78, 79, 81, 82, and 83 provide the in-phase and quadrature components of the three carriers at the frequencies $2a(k)$, $2a(k+1)$, and $2a(k+2)$, respectively. The received signal is also applied by a lead 84 to six demodulators 85, 86, 87, 88, 89, and 91, respectively. The locally generator carriers from the divide-by-two circuits 77, 78, 79, 81, 82, and 83 are applied by leads 92, 93, 94, 96, 97, and 98, respectively, to the demodulators 85, 86, 87, 88, 89, and 91, respectively. The outputs from demodulators 85, 86, 87, 88, 89, and 91, respectively, are passed through low-pass filters 99, 101, 102, 103, 104, and 106, respectively, each low-pass filter being similar in spectral shaping to each other and to the filters 31, 46, 47, 32, 33, 48, and 59 employed in the transmitter in FIG. 1.

Figure 4:
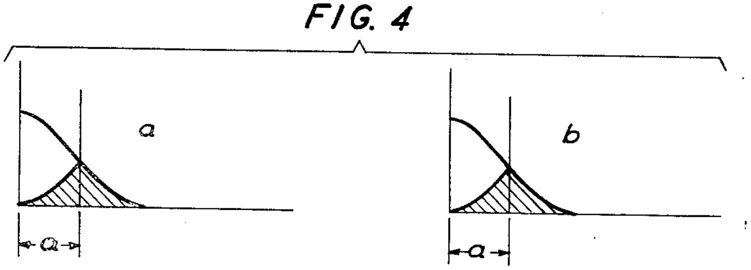
FIGS. 4, 5, and 6 each show frequency spectra of signals appearing in an individual channel of the receiver shown in FIG. 2 after demodulation and filtering.
Figure 5:
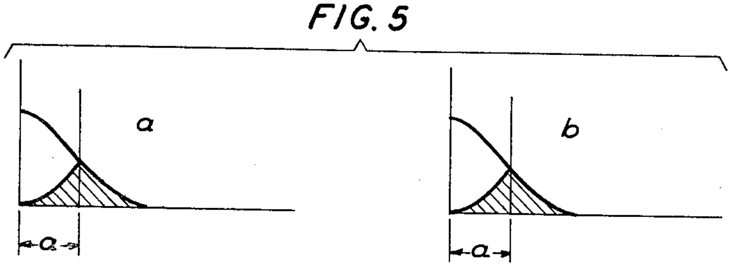
Figure 6:
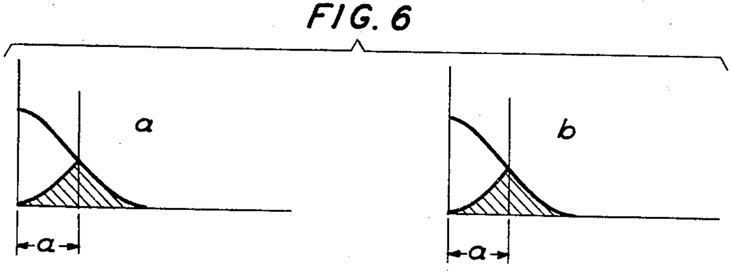

The frequency spectra of the signals appearing on the outputs of low-pass filters 99, 101, 102, 103, 104, and 106 on the leads 107, 108, 109, 111, 112, and 113, respectively, can be seen in FIGS. *4a*, *4b*, *5a*, *5b*, *6a*, and *6b*, respectively. The quadrature interference signal has been removed by the demodulation with the locally generated carrier in quadrature therewith and filtered so that the signals shown in FIGS. *4a*, *4b*, *5a*, *5b*, *6a*, and *6b*, respectively, contain only interference from adjacent channels. The two end channels, shown in FIGS. 4 and 6, each have two interference signals because there is only one adjacent channel while the signals shown in FIG. 5 each have four interference signals because there are two adjacent channels. It should be noted that from the frequency spectra shown in FIGS. 4, 5, and 6, therefore one cannot tell the difference between the signals therein because the interference signals will occupy the same part of the frequency spectra and all represent bandlimited signals at the dotting frequency (i.e., $a$) passing through zero at the sampling instants for that particular channel. Therefore, each signal on the leads 107, 111, and 112 are sampled by the in-phase timing signal in sampling circuits 114, 116, and 117, respectively, while the signals on the leads 108, 109, and 113, respectively, are sampled by the quadrature timing signal in samplers 118, 119, and 121, respectively, to provide the information contained in the original data signals on the leads labeled data *a*, *b*, *c*, *d*, *e*, and *f*, respectively.

While the disclosed embodiment is a three-channel parallel transmission system, it should be clear that the techniques employed therein are applicable to parallel transmisison systems employing two or more channels. As the number of channels increases, the bandwidth utilization approaches the ideal Nyquist limit. A representative system for transmitting data through telephone voice channels may include ten channels with carriers at 800, 1000, 1200, 1400, 1600, 1800, 2000, 2200, 2400 and 2600 cycles per second. A data rate of 200 symbols per second would be employed to yield a total data rate of 4000 symbols per second with a bandwidth utilization of 2200 cycles per second.

The techniques taught by this invention may be, however, employed at any carrier frequency and for any data rate. The carrier frequencies need not be multiples of the data rate, although the differences between carrier frequencies must be so related.

It is to be understood that the above-described arrangement is simply illustrative of the application of the principles of this invention. Numerous other arrangements employing the principles of this invention will be readily apparent to those skilled in the art.

What is claimed is:

1. In combination:
means for generating a first carrier signal at a first frequency;
means for generating a second carrier signal at said first frequency in quadrature with said first carrier signal;
means for generating a first data signal having a predetermined data rate;
means for generating a second data signal having said predetermined data rate in quadrature with said first data signal;
means for generating a third carrier signal at a second frequency displaced from said first frequency by said predetermined data rate, said third carrier signal being in-phase with said first carrier signal;
means for generating a third data signal having said predetermined data rate in phase with said second data signal;
means for modulating said first carrier signal with said first data signal to provide a first modulated signal;
means for modulating said second carrier signal with said second data signal to provide a second modulated signal;
means for modulating said third carrier signal with said third data signal to provide a third modulated signal;
means for combining signals applied thereto for providing a composite signal; and
first, second, and third means for applying said first, second, and third modulated signals, respectively, to said combining means.

2. The combination as defined in claim 1 including:
means for generating a fourth carrier signal at said second frequency in phase with said second carrier signal;
means for generating a fourth data signal having said predetermined data rate in phase with said first data signal; ;
means for modulating said fourth carrier signal with said fourth data signal to provide a fourth modulated signal; and
means for applying said fourth modulated signal to said combining means.

3. The combination as defined in claim 2 including:
means for generating a fifth carrier signal at a third frequency displaced from said second frequency by said predetermined data rate, said fifth carrier signal being in phase with said first carrier signal;
means for generating a fifth data signal having said predetermined data rate in phase with said first data signal;
means for modulating said fifth carrier signal with said fifth data signal to provide a fifth modulated signal; and
means for applying said fifth modulated signal to said combining means.

4. The combination as defined in claim 3 including:
means for generating a sixth carrier signal at said third frequency in phase with said second carrier signal;
means for generating a sixth data signal having said predetermined data rate, in phase with said second data signal;
means for modulating said sixth carrier signal with said sixth data signal to provide a sixth modulated signal; and
means for applying said sixth modulated signal to said combining means.

5. The combination as defined in claim 1 including:
means for generating a seventh carrier signal at a fourth frequency displaced from said first frequency by said predetermined data rate, said seventh carrier signal being in phase with said first carrier signal;
means for generating a pilot signal having said predetermined data rate in quadrature with said first data signal;
means responsive to said pilot signal for modulating said seventh carrier signal to provide an amplitude-modulated pilot tone; and
means for applying said amplitude-modulated pilot tone to said combining means.

6. The combination as defined in claim 5 including:
a receiver for receiving said composite signal; and
a transmission medium for applying said composite signal to said receiver.

7. The combination as defined in claim 6 wherein said receiver includes:
means responsive to said amplitude-modulated pilot tone for generating said first, second, and third carrier signals;
first, second and third demodulators responsive to the product of said composite wave and said first, second and third carrier signals, respectively, for providing first, second, and third demodulated signals;
first, second, and third low-pass filters for filtering said first, second, and third demodulated signals; and
first, second, and third means for sampling said first, second, and third filtered signals to restore said first, second, and third data signals.

References Cited

UNITED STATES PATENTS

| | | | |
|---|---|---|---|
| 2,905,812 | 9/1959 | Doelz et al. | 343—203 |
| 3,163,718 | 12/1964 | Deman | 179—15 |

OTHER REFERENCES

R. W. Chang, "Synthesis of Band-Limited Orthogonal Signals for Multichannel Data Transmission," Bell Systems Technical Journal, vol. 45, December 1966, pp. 1775–1796.

KATHLEEN H. CLAFFY, Primary Examiner

A. B. KIMBALL, Jr., Assistant Examiner

U.S. Cl. X.R.

325—60